(12) United States Patent
Bhalla et al.

(10) Patent No.: US 10,176,959 B1
(45) Date of Patent: Jan. 8, 2019

(54) SWITCHGEAR UNIT WITH ISOLATED INPUT FUSE HOLDER ASSEMBLY

(71) Applicant: Eaton Corporation, Cleveland, OH (US)

(72) Inventors: Richard Bhalla, Fletcher, NC (US); Thomas A. Farr, Candler, NC (US)

(73) Assignee: Eaton Intelligent Power Limited (IE)

(*) Notice: Subject to any disclaimer, the term of this patent is extended or adjusted under 35 U.S.C. 154(b) by 0 days.

(21) Appl. No.: 15/824,169

(22) Filed: Nov. 28, 2017

(51) Int. Cl.

| | | |
|---|---|---|
| *H01H 85/20* | (2006.01) | |
| *H02B 13/025* | (2006.01) | |
| *H02B 1/26* | (2006.01) | |
| *H01R 13/68* | (2011.01) | |
| *H02B 1/38* | (2006.01) | |
| *H01H 85/143* | (2006.01) | |
| *H02B 1/18* | (2006.01) | |
| *H02B 1/04* | (2006.01) | |
| *H02B 1/30* | (2006.01) | |
| *H02B 13/045* | (2006.01) | |

(52) U.S. Cl.
CPC ...... *H01H 85/2045* (2013.01); *H01H 85/143* (2013.01); *H02B 1/04* (2013.01); *H02B 1/18* (2013.01); *H02B 1/26* (2013.01); *H02B 13/025* (2013.01); *H01R 13/68* (2013.01); *H02B 1/306* (2013.01); *H02B 1/38* (2013.01); *H02B 13/045* (2013.01)

(58) Field of Classification Search
CPC . H02B 1/18; H02B 1/306; H02B 1/38; H02B 1/26; H02B 13/005; H02B 13/045; H01H 85/2045; H01H 85/143; H01H 9/102; H01H 9/104; H01H 31/127; H01R 13/68

USPC ............... 361/600–678; 337/186, 468, 6; 200/50.21, 50.27
See application file for complete search history.

(56) References Cited

U.S. PATENT DOCUMENTS

| | | | | |
|---|---|---|---|---|
| 2,558,074 | A * | 6/1951 | Claybourn | H01H 33/52 200/50.21 |
| 3,327,076 | A * | 6/1967 | Lindell | H01H 33/12 200/50.23 |
| 3,896,353 | A * | 7/1975 | Burton | H02B 11/133 200/50.26 |
| 4,355,269 | A * | 10/1982 | Burton | H02K 15/125 318/436 |
| 5,757,260 | A * | 5/1998 | Smith | H01H 9/102 200/50.21 |
| 7,897,890 | B2 * | 3/2011 | Kikukawa | H01H 33/66 218/120 |

(Continued)

*Primary Examiner* — Zachary Pape
(74) *Attorney, Agent, or Firm* — Ward and Smith, P.A.

(57) ABSTRACT

A switchgear unit includes an enclosure having a first compartment and a second compartment and a fuse assembly mounted on a wall that separates the first compartment and the second compartment, the fuse assembly comprising a fuse housing disposed in the second compartment and accessible from the first compartment via an opening in the wall. The fuse assembly may include a cover configured to separate a fuse in the fuse housing from the first compartment and that is removable to provide access to the fuse from the first compartment. The fuse assembly may further include a power input terminal supported by the fuse housing and accessible from the second compartment and a switch disposed in the first compartment and configured to electrically connect the power input terminal to the first fuse connection terminal.

20 Claims, 11 Drawing Sheets

(56) References Cited

U.S. PATENT DOCUMENTS 9,941,675 B2 * 4/2018 Ren ........................ H02B 11/02

* cited by examiner

SWITCHGEAR UNIT WITH ISOLATED INPUT FUSE HOLDER ASSEMBLY

BACKGROUND

The inventive subject matter relates to electrical apparatus and, more particularly, to switchgear.

FIG. 1 illustrates a conventional medium-voltage switchgear unit 10. The switchgear unit 10 includes a housing 15 having a plurality of compartments defined therein, including a front compartment 20, a rear compartment 25, and a bus compartment 30. The rear compartment 25 and the bus compartment 30 are coupled to a plenum 40, which may receive heated gases from the other compartments. The bus compartment 30 has a plurality of input power buses 31 housed therein.

The front compartment 20 houses a variety of switchgear components, here shown as including a contactor 28 and a low-voltage sub-compartment 21 that houses circuitry and mechanisms for controlling the contactor 28 and other devices in the switchgear unit 10. The front compartment 20 also houses an input fuse assembly 23 that holds a plurality of fuses 24 and includes an input isolation switch 27. The fuse assembly 23 is mounted on a wall 22 that separates the front compartment 20 from the rear compartment 25. The fuses 24 fusibly couple the isolation switch 27 to the contactor 28 and other devices within the switchgear unit 10. The isolation switch 27 is configured to couple the fuses 24 to the plurality of input power buses 31 and is controlled by mechanical linkage extending from the handle mechanism.

The fuse assembly 23 includes top and bottom frame sections 23a and 23b. The top frame section 23a supports the isolation switch 27 and first fuse connection terminals for connecting to first terminals of the fuses 24. The bottom frame section 23b supports second fuse connection terminals for connecting to second terminals of the fuses 24, along with conductive contacts that are configured to mate with conductive contacts 26 extending from the contactor 28.

SUMMARY OF THE INVENTION

Some embodiments of the inventive subject matter provide a switchgear unit including an enclosure having a first compartment and a second compartment separated by a wall and a fuse assembly comprising a power input terminal disposed in the second compartment, a first fuse connection terminal in the second compartment and configured to be electrically connected to the power input terminal, and a second fuse connection terminal in the second compartment. A frame extends through an opening in the wall and supports the input terminal, the first fuse connection terminal and the second fuse connection terminal such that a fuse connected between the first and second fuse connection terminals is positioned in the second compartment and accessible from the first compartment. The unit further includes a power input bus connected to the input terminal of the fuse assembly in the second compartment.

In some embodiments, the first and second fuse connection terminals may be accessible from the first compartment. The unit may further include a cover for separating the fuse and the first and second fuse connection terminals from the first compartment and that is removable to allow installation and removal of the fuse via the first compartment.

In further embodiments, the switchgear unit may further include a switch supported by the frame, disposed in the first compartment and configured to couple the power input terminal to the first fuse connection terminal. The frame may include a fuse housing mounted on the wall and supporting the input terminal and the second fuse connection terminal and a switch housing mounted on the fuse housing and supporting the switch and the first fuse connection terminal. The fuse assembly may further include a first contact supported by the fuse housing and connected to the input terminal and a conductive stab extending from the switch housing, electrically connected to the switch and configured to engage the contact. In further embodiments, the fuse assembly may further include a contact supported by the fuse housing, electrically connected to the second fuse connection terminal and configured to engage a contact of a device positioned in the first compartment.

In still further embodiments, the fuse housing may further include a first portion mounted on the wall and supporting the input terminal and a second portion mounted on the wall, spaced apart from the first portion and supporting the second fuse connection terminal. The switch housing may be mounted on the first portion.

The first compartment may be a front compartment that houses switches and other devices, and the second compartment may be a rear compartment provides an exhaust passage to a plenum positioned above the rear compartment. The switchgear unit may further include a bus compartment and the power input bus may pass from the bus compartment into the rear compartment.

Additional embodiments provide a switchgear unit including an enclosure having a first compartment and a second compartment and a fuse assembly mounted on a wall that separates the first compartment and the second compartment. The fuse assembly includes a fuse housing disposed in the second compartment and accessible from the first compartment via an opening in the wall.

The fuse assembly may include a cover configured to separate a fuse in the fuse housing from the first compartment and that is removable to provide access to the fuse from the first compartment. The fuse assembly may also include first and second fuse connection terminals supported by the fuse housing, disposed in the second compartment, accessible from the first compartment via the opening and configured to be covered by the cover.

The fuse assembly may further include a power input terminal supported by the fuse housing and accessible from the second compartment and a switch disposed in the first compartment and configured to electrically connect the power input terminal to the first fuse connection terminal. The switchgear unit may include a power input bus connected to the input terminal in the second compartment. The second compartment may serve as an arc chamber configured to be coupled to an exhaust plenum outside of the switchgear unit.

Still further embodiments provide a fuse assembly including a frame configured to be mounted on a wall between a first compartment and a second compartment of a switchgear unit, a first fuse connection terminal, supported by the frame and configured to be disposed in the second compartment and accessible from the first compartment through an opening in the wall, and a second fuse connection terminal supported by the frame and configured to be disposed in the second compartment and accessible from the first compartment through the opening in the wall. The frame and the first and second fuse connection terminals are configured such that a fuse connected between the first and second fuse connection terminals is positioned in the second compartment and accessible from the first compartment via the opening in the wall. The fuse assembly may also include a cover configured to separate the fuse and the first and second fuse connection terminals from the first compartment and removable to provide access to the fuse and the first and second fuse connection terminals. The fuse assembly may further include an input terminal supported by the frame and configured to be disposed in the second compartment and a switch supported by the frame and configured to be disposed in the first compartment and to electrically connect the input terminal to the first fuse connection terminal.

DETAILED DESCRIPTION

Figure 1:
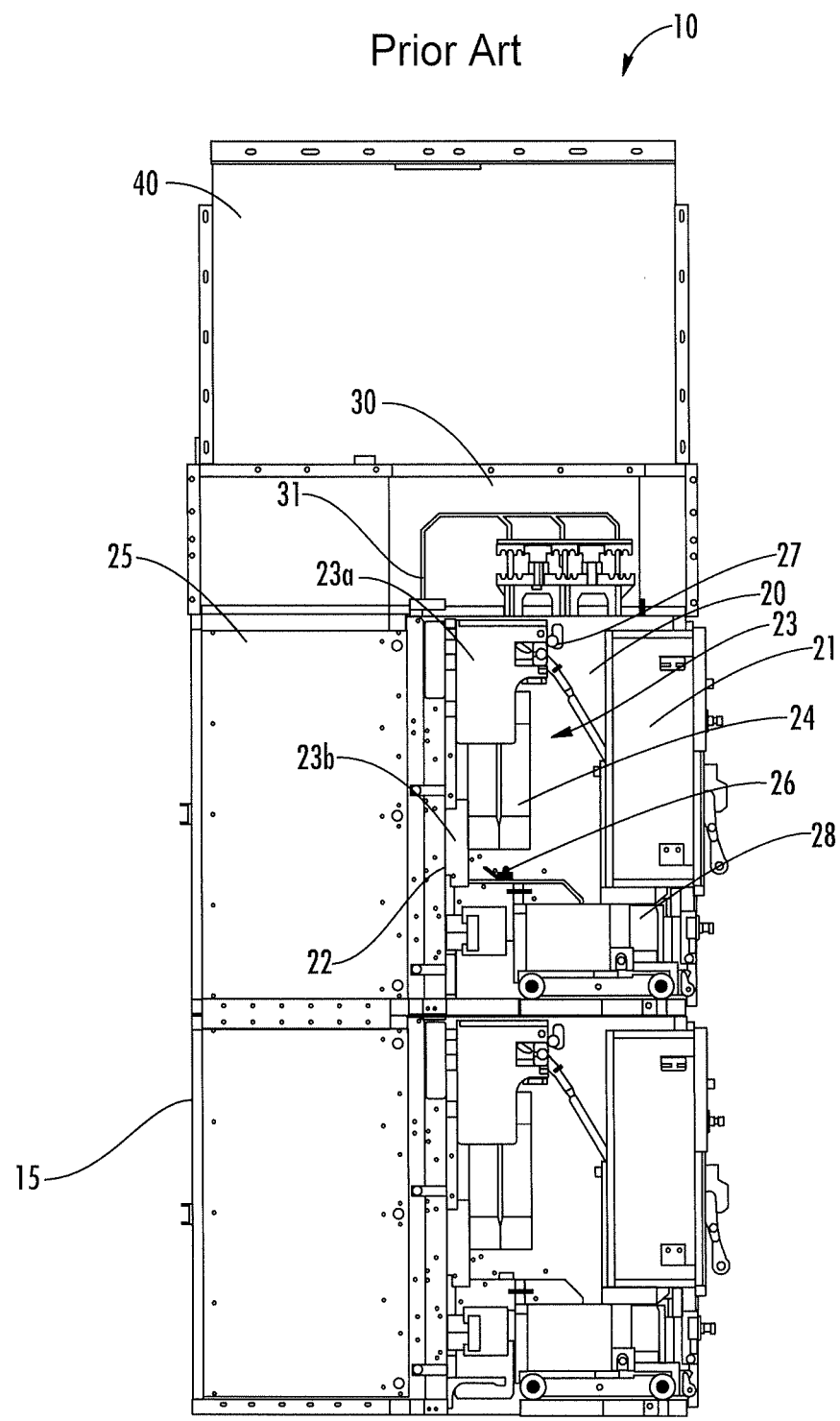
FIG. 1 is a side cutaway view of a switchgear unit with a conventional fuse assembly.

Specific exemplary embodiments of the inventive subject matter now will be described with reference to the accompanying drawings. This inventive subject matter may, however, be embodied in many different forms and should not be construed as limited to the embodiments set forth herein; rather, these embodiments are provided so that this disclosure will be thorough and complete, and will fully convey the scope of the inventive subject matter to those skilled in the art. In the drawings, like numbers refer to like items. It will be understood that when an item is referred to as being "connected" or "coupled" to another item, it can be directly connected or coupled to the other item or intervening items may be present. As used herein the term "and/or" includes any and all combinations of one or more of the associated listed items.

The terminology used herein is for the purpose of describing particular embodiments only and is not intended to be limiting of the inventive subject matter. As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, items, and/or components, but do not preclude the presence or addition of one or more other features, integers, steps, operations, items, components, and/or groups thereof.

Unless otherwise defined, all terms (including technical and scientific terms) used herein have the same meaning as commonly understood by one of ordinary skill in the art to which this inventive subject matter belongs. It will be further understood that terms, such as those defined in commonly used dictionaries, should be interpreted as having a meaning that is consistent with their meaning in the context of the specification and the relevant art and will not be interpreted in an idealized or overly formal sense unless expressly so defined herein.

Figure 2:
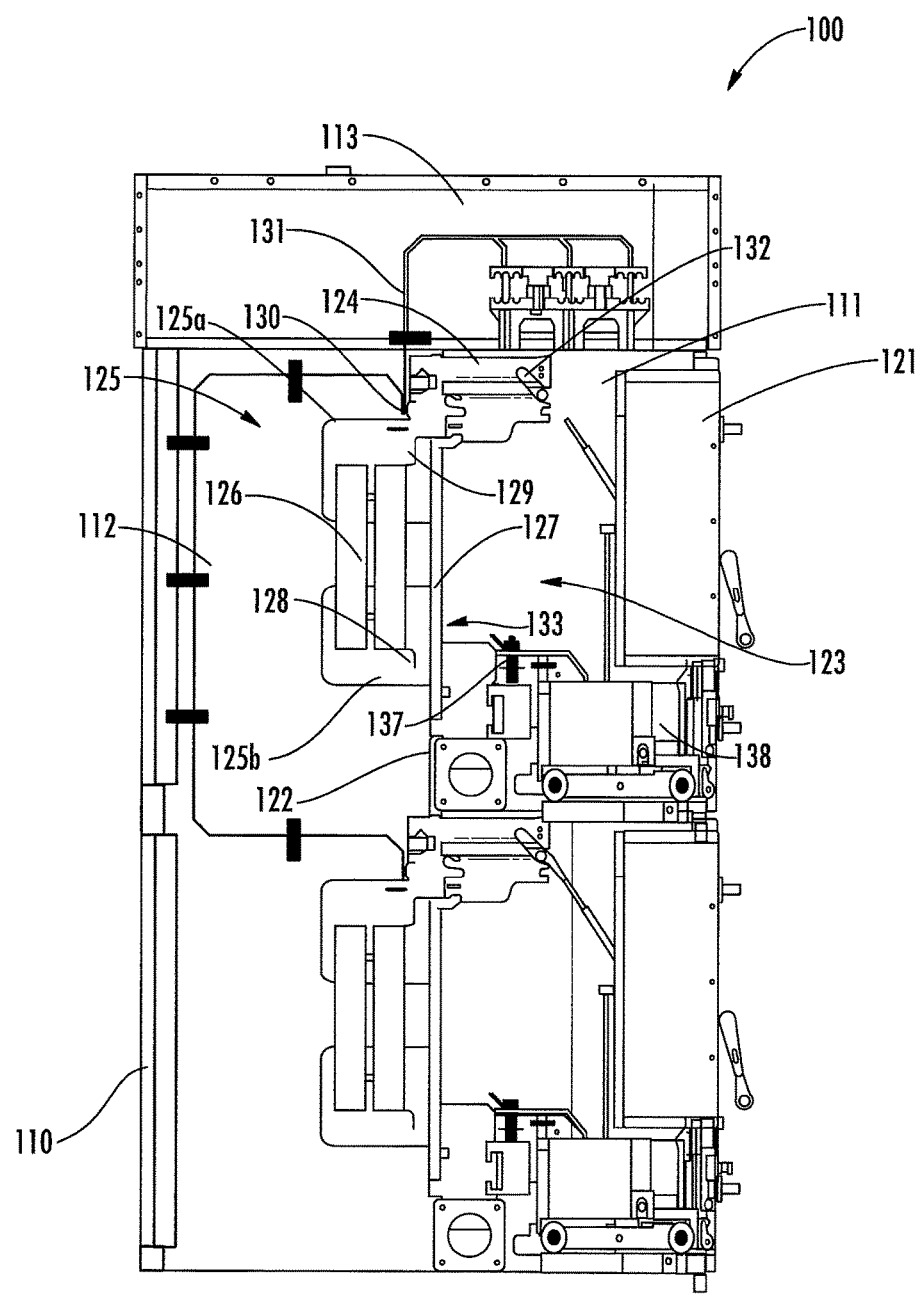
FIGS. 2 and 3 are side and perspective cutaway views of a switchgear unit according to some embodiments of the inventive subject matter.
Figure 3:
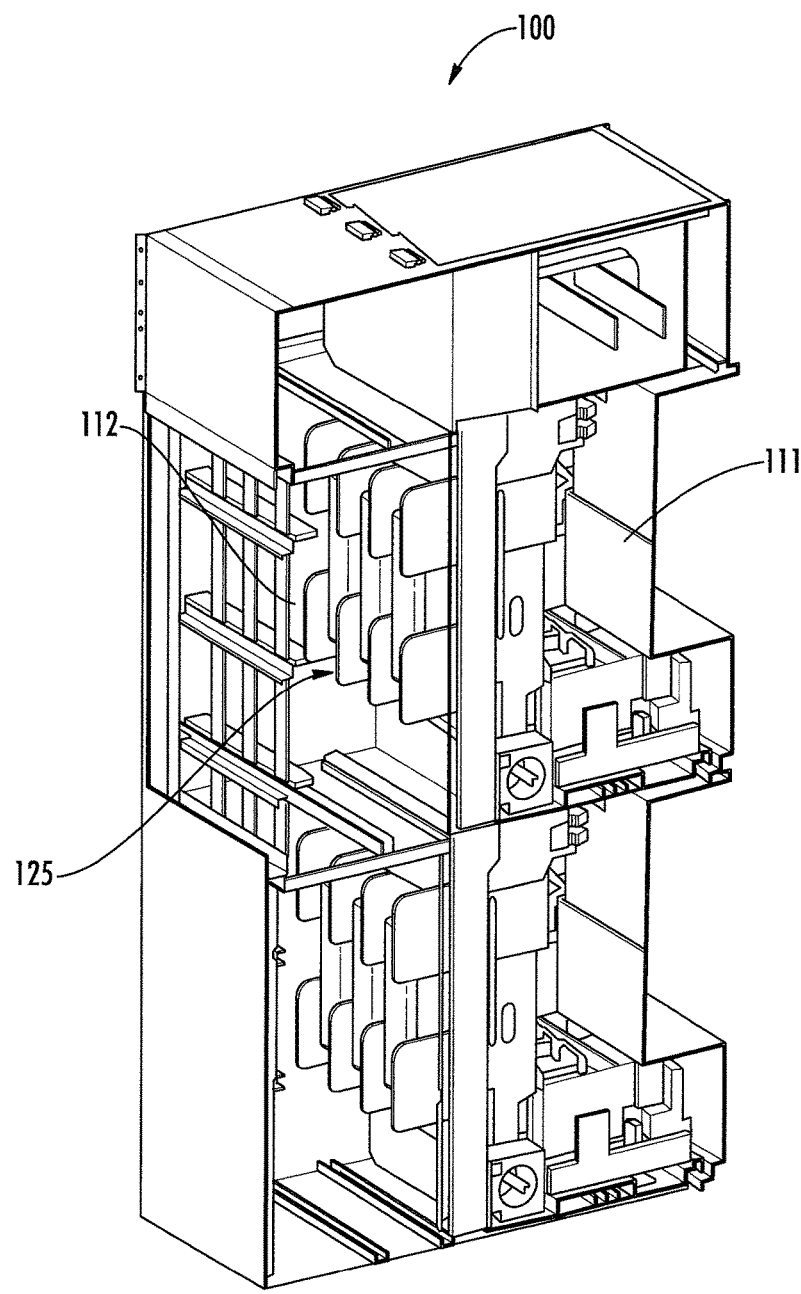

FIGS. 2 and 3 provide cutaway side and perspective views, respectively, of a switchgear unit 100 according to some embodiments of the inventive subject matter, with FIGS. 4-16 providing various detailed view of components of the switchgear unit 100. Referring to FIGS. 2 and 3, the switchgear unit 100 includes an enclosure 110 having a front compartment 111 and a rear compartment 112 defined therein. The enclosure 110 may be formed from sheet metal, and the front compartment 111 and rear compartment 112 may be bounded by walls that are primarily comprised of sheet metal. The front compartment houses a low-voltage sub-compartment 121 and a contactor 138, in a manner similar to that described above with reference to FIG. 1.

The unit 100 further includes a fuse holder assembly that is mounted at a wall 122 separating the front compartment 111 and the rear compartment 112. The fuse holder assembly includes a frame including a fuse housing 125 and a switch housing 124 mounted on the fuse housing 125. The fuse housing 125 extends from the wall 122 into the rear compartment 112. As illustrated, the fuse housing 125 includes an upper portion 125a that mates with the switch housing 124 and a lower portion 125b that supports lower fuse connection terminals 128. The lower portion 125b further supports conductive contacts 137 configured to mate with conductive contacts (here, compression contacts 137) of a device in the front compartment 111, such as the contactor 138. Although the fuse housing 125 is illustrated as including separate upper and lower portions 125a, 125b, it will be appreciated that the fuse housing 125 could be fabricated as a single unit.

The switch housing 124 is mounted in the upper portion 125a of the fuse housing 125 in the front compartment 111. The switch housing 124 supports upper fuse connection terminals 129 and an isolation switch 132 that is electrically connected to the upper fuse connection terminals 129 and operated by mechanical linkage extending from a handle mechanism accessible from the front of the front compartment 111. The switch housing 124 further supports power input terminals 130, which are disposed in the rear compartment 112 and electrically connected to the isolation switch 132. Power input buses 131 extend into the rear compartment 112 from a main bus compartment 113 positioned above the front compartment 111 and are connected to the power input terminals 130. Thus, the isolation switch 132 provides a switched connection from the power input buses 131 to the upper fuse connection terminals 129.

It will be appreciated that the fuse housing 125 and the switch housing 124 may be formed from non-conductive materials (e.g., a polymer, composite or the like) to provide insulation of the conductive structures supported by these housings. The fuse housing 125 and the switch housing 124 may also include metal or other conductive components that do not form part of an energized path, but instead are used to provide structural support or serve other functions.

The rear compartment 112 serves as an arc chamber that provides an exhaust passage to a plenum (not shown) above the rear compartment 112. The fuse housing 125, switch housing 124 and fuse connection terminals 128, 129 are configured such that fuses 126 connected to the fuse connection terminals 128, 129 are disposed in the rear compartment 112. The fuse housing 125 further comprises a cover 127 that covers an opening 133 in the compartment wall 122 to isolate the fuses 126 and the fuse connection terminals 128, 129 from components disposed in the front compartment 111. Accordingly, gases produce by arcing at or near the upper fuse connection terminals 129 is contained in the rear compartment 112 and impeded from entering the front compartment 111, where they could damage relatively sensitive components. The cover 127 is removable, however, to allow access to the fuse connection terminals 128, 129 through the opening 133 in the wall 122, such that the fuses 126 may be installed and removed via the front compartment 111.

Figure 4:
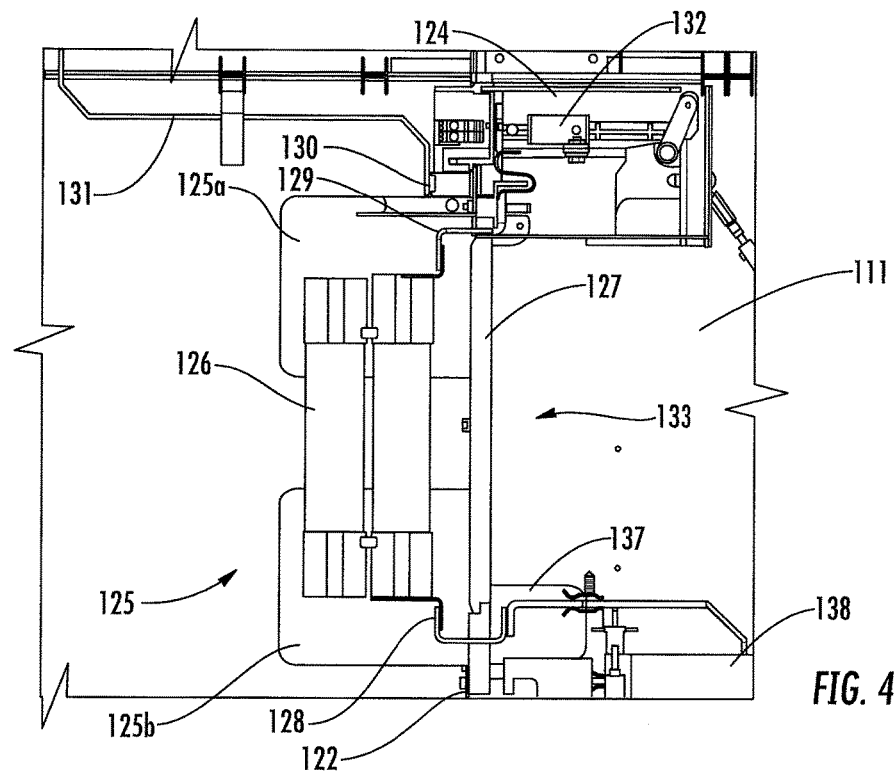
FIGS. 4 and 5 are detailed side cutaway views of a fuse assembly of the switchgear unit of FIGS. 2 and 3 showing a fuse housing having a removable cover in closed and open positions, respectively.
Figure 5:
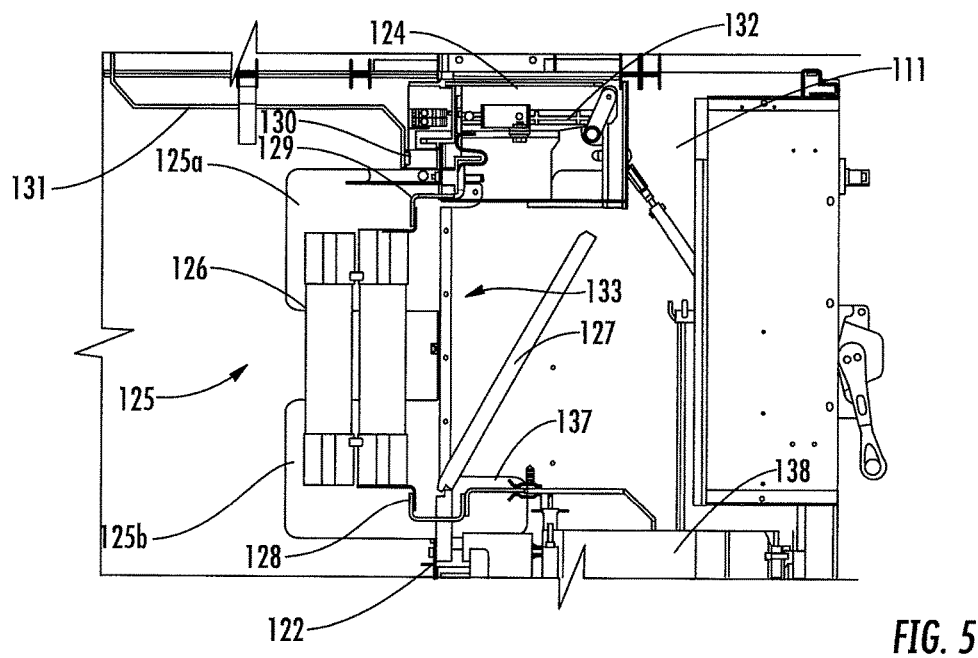

FIGS. 4 and 5 are detailed side views illustrating movement of the cover 127. The cover 127 may be fabricated from an insulating material (e.g., polymer, composite, or the like), and may hinge at a bottom edge thereof to expose the fuses 126 through the opening 133 in the compartment wall 122. Access to the fuses 126 may require opening a front door of the front compartment 111, which may support the low-voltage sub-compartment 121 and move the low-voltage sub-compartment aside to enable access to cover 127 and the underlying fuses 126.

Figure 6:
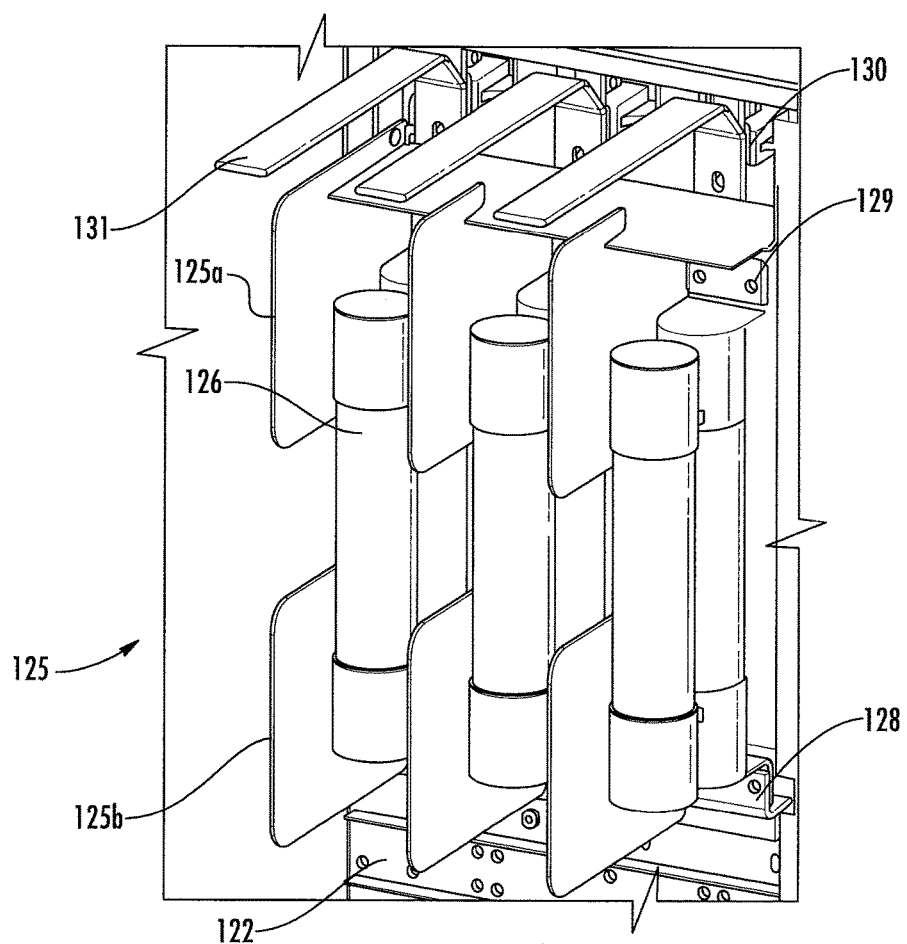
FIG. 6 is a detailed rear perspective view of the fuse assembly of FIGS. 4 and 5.
Figure 7:
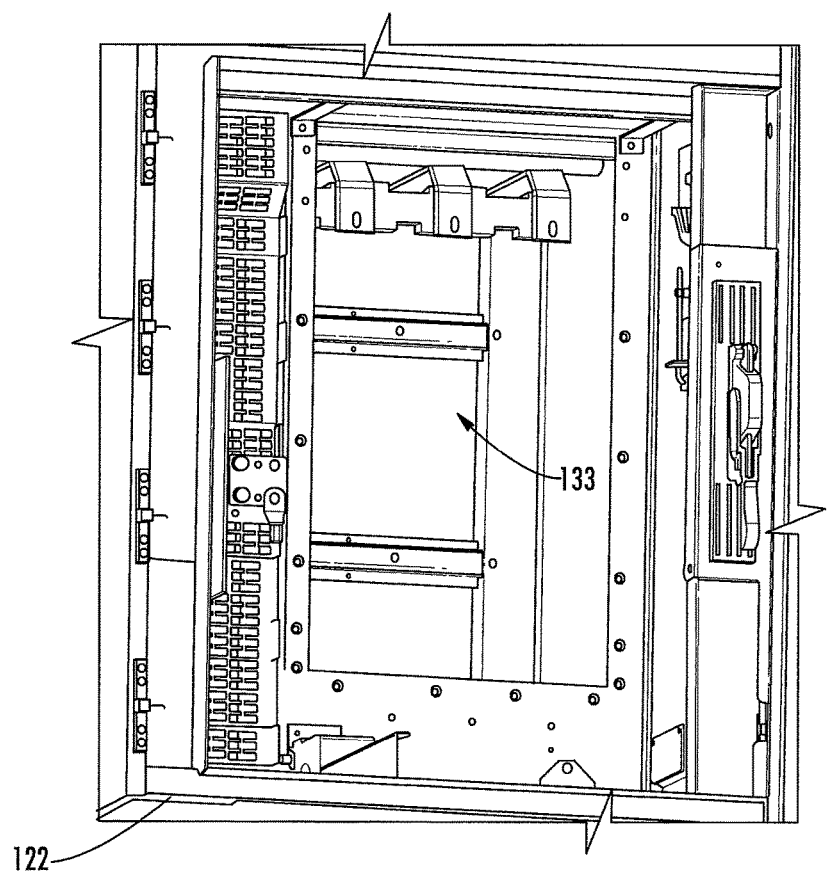
FIG. 7 is a detailed perspective view of a wall opening at which the fuse assembly illustrated in FIGS. 4 and 5 is mounted.

FIG. 6 illustrates a rear view of the fuse housing 125, illustrating that the upper and lower portions 125a, 125b of the fuse housing 125 may be open to the rear compartment 112 and may include insulating panels that isolate the fuses 126 and fuse connection terminals 128, 129 for the respective three phases from one another. The power input buses 131 are connected to power input terminals 130 at an upper rear portion of the upper portion 125a of the fuse housing 125. FIG. 7 is a detailed front perspective view of the opening 133 in the compartment wall 122 with the fuse holder assembly removed, illustrating positioning of the input power buses 131.

Figure 8:
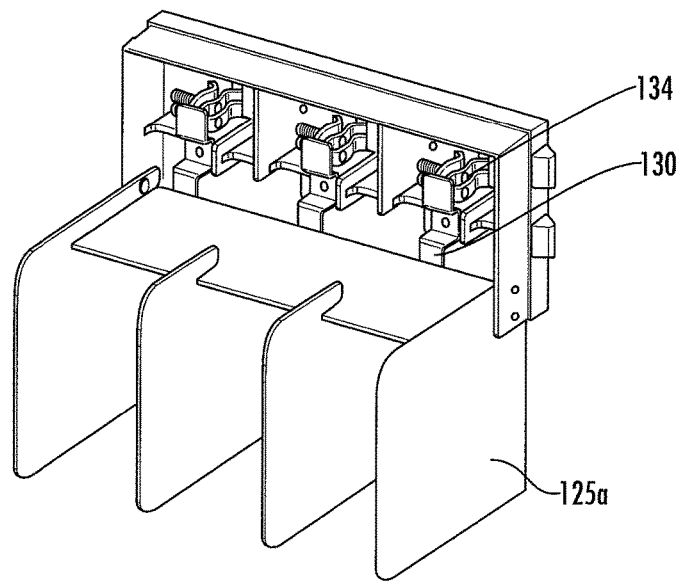
FIGS. 8 and 9 are isolated rear and front perspective views of an upper portion of the fuse housing illustrated in FIGS. 4 and 5.
Figure 9:
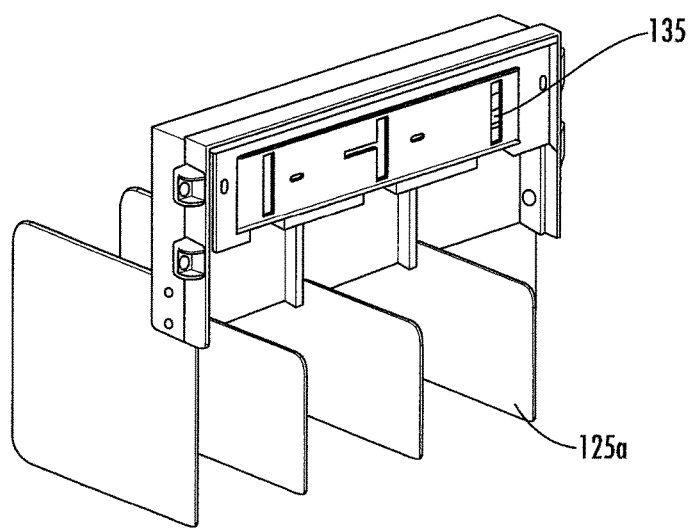
Figure 10:
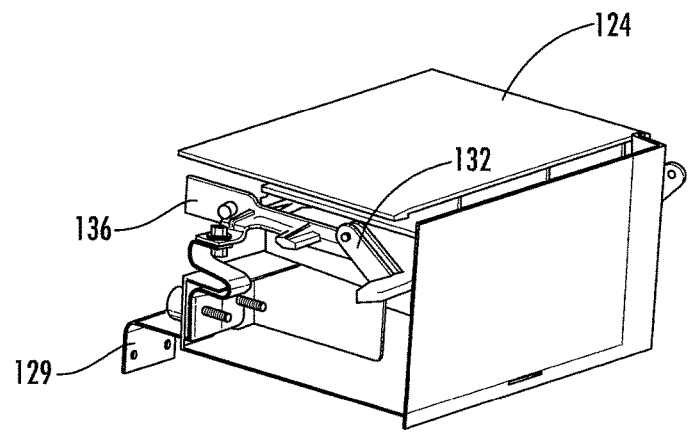
FIGS. 10-12 are isolated perspective, side and front views, respectively, of a switch housing of the fuse assembly illustrated in FIGS. 4 and 5.
Figure 11:
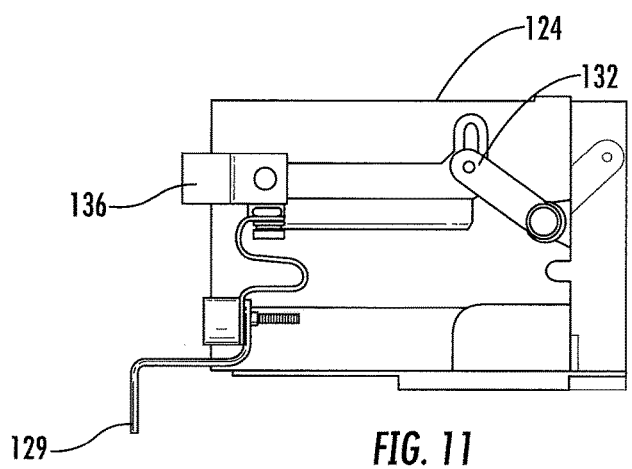
Figure 12:
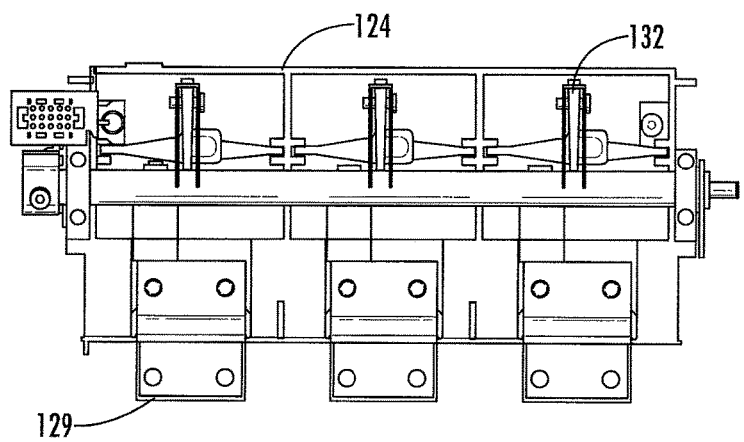

FIGS. 8 and 9 are isolated rear and front perspective views, respectively, of the upper portion 125a of the fuse housing 125. The upper portion 125a supports the input terminals 130, which are electrically connected to compression contacts 134. Referring to FIGS. 10-12 in conjunction with FIGS. 8 and 9, the switch housing 124 supports conductive stabs 136 that are configured to pass through slots 135 in an upper front face of the upper portion 125a of the fuse housing 125 and to engage the compression contacts 134. The stabs 136 are electrically connected to first terminals of the isolation switch 132, and second terminals of the isolation switch 132 are electrically connected to the upper fuse connection terminals 129, which are supported by the switch housing 124.

Figure 13:
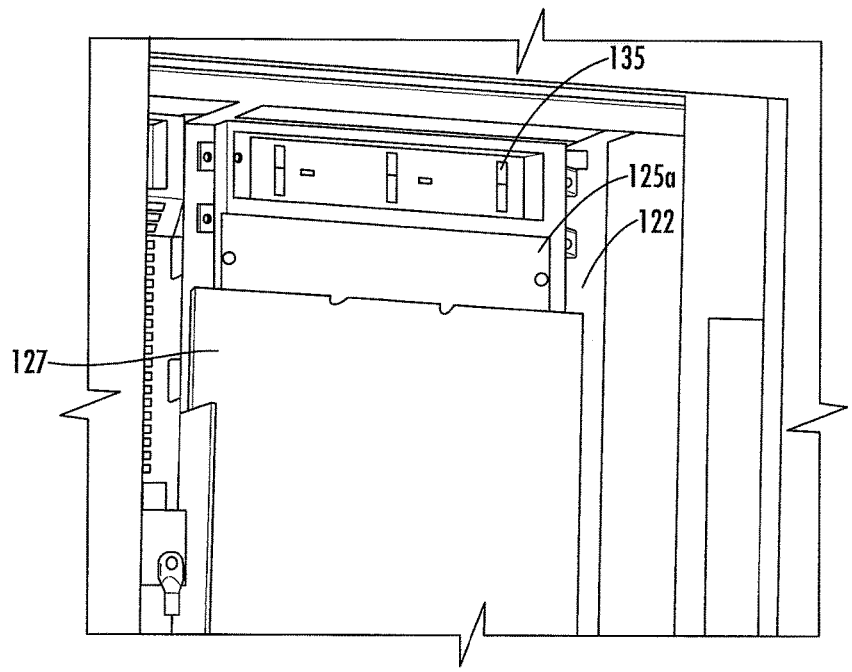
FIGS. 13 and 14 are perspective views of the fuse assembly of FIGS. 4 and 5 which the switch housing absent and installed, respectively.
Figure 14:
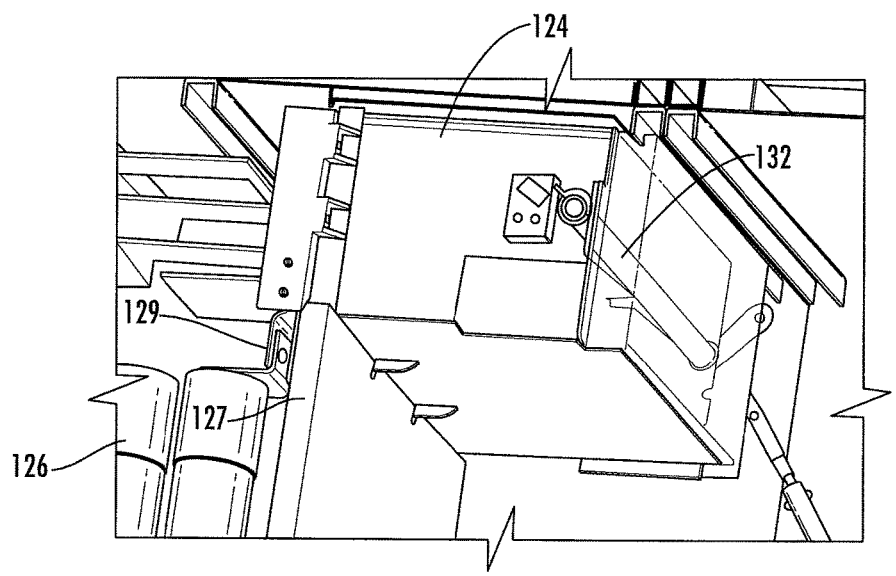
Figure 15:
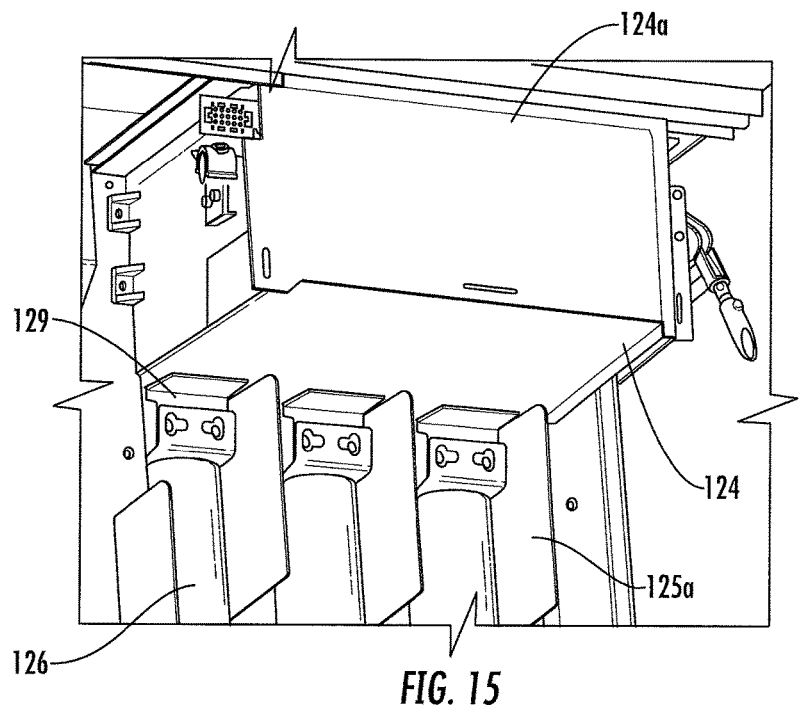
FIGS. 15 and 16 are perspective views of the switch housing with a front cover in place and removed, respectively.
Figure 16:
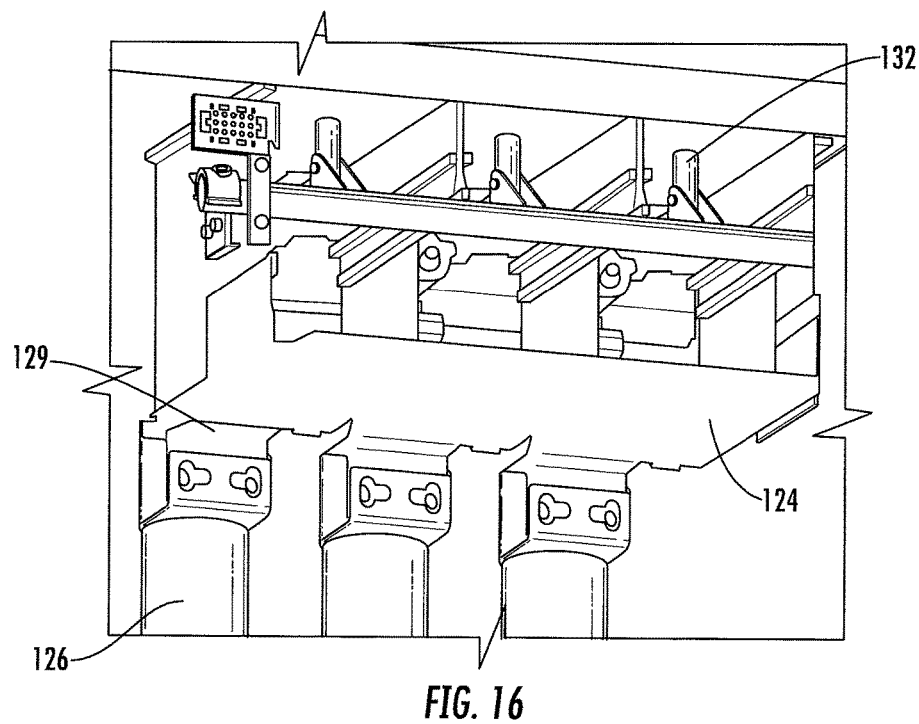
Figure 17:
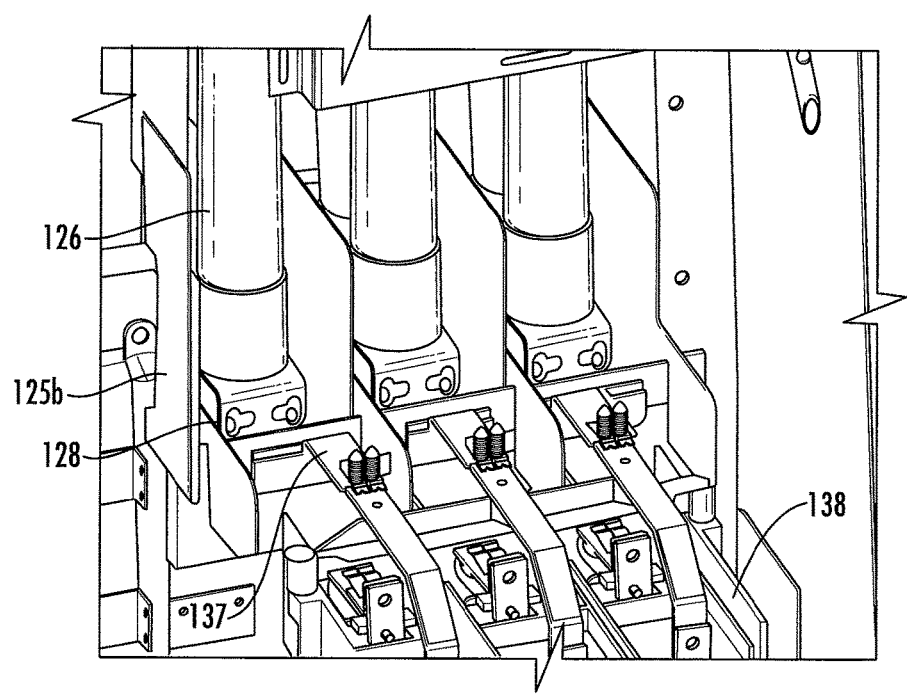
FIG. 17 is a perspective view illustrating a lower portion of the fuse housing of the fuse assembly shown in FIGS. 4 and 5.

FIG. 13 illustrates the fuse housing 125 installed with the switch housing 124 removed and the cover 127 in place. FIG. 14 illustrates the apparatus with the switch housing 124 installed. FIGS. 15 and 16 illustrate that the switch housing 124 may include a cover 124a, which may be removed to provide access to the isolation switch 132. FIG. 17 is a detailed perspective view of the lower portion 125b of the fuse housing 125, showing conductive contacts 137 (here, conductor stabs) extending from the lower portion 125b of the fuse housing that mate with conductive contacts of the contactor 138 (here, compression contact). It will be appreciated that other connections may be used, such as bolted connections.

In the drawings and specification, there have been disclosed exemplary embodiments of the inventive subject matter. Although specific terms are employed, they are used in a generic and descriptive sense only and not for purposes of limitation, the scope of the inventive subject matter being defined by the following claims.

That which is claimed:

1. A switchgear unit comprising:
   an enclosure having a first compartment and a second compartment separated by a wall;
   a fuse assembly comprising a power input terminal disposed in the second compartment, a first fuse connection terminal in the second compartment and configured to be electrically connected to the power input terminal, a second fuse connection terminal in the second compartment, and a frame that extends through an opening in the wall and supports the input terminal, the first fuse connection terminal and the second fuse connection terminal such that a fuse connected between the first and second fuse connection terminals is positioned in the second compartment and accessible from the first compartment; and
   a power input bus connected to the input terminal of the fuse assembly in the second compartment.

2. The switchgear unit of claim 1, wherein the first and second fuse connection terminals are accessible from the first compartment.

3. The switchgear unit of claim 2, further comprising a cover for separating the fuse and the first and second fuse connection terminals from the first compartment and that is removable to allow installation and removal of the fuse via the first compartment.

4. The switchgear unit of claim 1, wherein the fuse assembly further comprises a switch supported by the frame, disposed in the first compartment and configured to couple the power input terminal to the first fuse connection terminal.

5. The switchgear unit of claim 4, wherein the frame comprises:
   a fuse housing mounted on the wall and supporting the input terminal and the second fuse connection terminal; and
   a switch housing mounted on the fuse housing and supporting the switch and the first fuse connection terminal.

6. The switchgear unit of claim 5, where the fuse assembly further comprises:
   contact supported by the fuse housing and connected to the input terminal; and
   a conductive stab extending from the switch housing, electrically connected to the switch and configured to engage the contact.

7. The switchgear unit of claim 5, wherein the fuse assembly further comprises a contact supported by the fuse housing, electrically connected to the second fuse connection terminal and configured to engage a conductive stab of a device positioned in the first compartment.

8. The switchgear unit of claim 5:
   wherein the fuse housing comprises:
   a first portion mounted on the wall and supporting the input terminal; and
   a second portion mounted on the wall, spaced apart from the first portion and supporting the second fuse connection terminal; and wherein the switch housing is mounted on the first portion.

9. The switchgear unit of claim 1, wherein the fuse assembly further comprises a contact supported by the frame, disposed in the first compartment, electrically connected to the second fuse connection terminal and configured to engage a contact of a device positioned in the first compartment.

10. The switchgear unit of claim 1, wherein the second compartment serves as an arc chamber.

11. The switchgear unit of claim 10, wherein the first compartment is a front compartment, wherein the second compartment is a rear compartment that provides an exhaust passage to a plenum positioned above the rear compartment.

12. The switchgear unit of claim 11, further comprising a bus compartment and wherein the power input bus passes from the bus compartment into the rear compartment.

13. A switchgear unit comprising:
an enclosure having a first compartment and a second compartment; and
a fuse assembly mounted on a wall that separates the first compartment and the second compartment, the fuse assembly comprising a fuse housing disposed in the second compartment and accessible from the first compartment via an opening in the wall.

14. The switchgear unit of claim 13, wherein the fuse assembly further comprises a cover configured to separate a fuse in the fuse housing from the first compartment and that is removable to provide access to the fuse from the first compartment.

15. The switchgear unit of claim 14, wherein the fuse assembly further comprises first and second fuse connection terminals supported by the fuse housing, disposed in the second compartment, accessible from the first compartment via the opening and configured to be covered by the cover.

16. The switchgear unit of claim 15, wherein the fuse assembly further comprises a power input terminal supported by the fuse housing and accessible from the second compartment and a switch disposed in the first compartment and configured to electrically connect the power input terminal to the first fuse connection terminal, and wherein the switchgear unit further comprises a power input bus connected to the input terminal in the second compartment.

17. The switchgear unit of claim 13, wherein the second compartment serves as an arc chamber configured to be coupled to an exhaust plenum outside of the switchgear unit.

18. A fuse assembly comprising:
a frame configured to be mounted on a wall between a first compartment and a second compartment of a switchgear unit;
a first fuse connection terminal, supported by the frame and configured to be disposed in the second compartment and accessible from the first compartment through an opening in the wall; and
a second fuse connection terminal supported by the frame and configured to be disposed in the second compartment and accessible from the first compartment through the opening in the wall; and
wherein the frame and the first and second fuse connection terminals are configured such that a fuse connected between the first and second fuse connection terminals is positioned in the second compartment and accessible from the first compartment via the opening in the wall.

19. The fuse assembly of claim 18, further comprising a cover configured to separate the fuse and the first and second fuse connection terminals from the first compartment and that is removable to provide access to the fuse and the first and second fuse connection terminals.

20. The fuse assembly of claim 18, further comprising:
an input terminal supported by the frame and configured to be disposed in the second compartment; and
a switch supported by the frame and configured to be disposed in the first compartment and to electrically connect the input terminal to the first fuse connection terminal.

* * * * *